(12) United States Patent
Mankins

(10) Patent No.: US 6,300,560 B1
(45) Date of Patent: Oct. 9, 2001

(54) REPLACEABLE CONDUIT CONNECTOR FOR WIRING SYSTEMS

(76) Inventor: Thomas Allen Mankins, 336 Sienna Ct., Grand Junction, CO (US) 81503

( * ) Notice: Subject to any disclaimer, the term of this patent is extended or adjusted under 35 U.S.C. 154(b) by 0 days.

(21) Appl. No.: 09/255,746

(22) Filed: Feb. 23, 1999

(51) Int. Cl.[7] .................................................. H02G 15/24
(52) U.S. Cl. ........................................ 174/21 R; 285/127
(58) Field of Search .................................. 174/19, 21 R, 174/21 JS, 21 CA; 285/30, 31, 32, 71, 75, 94, 133.11, 134.1, 179

(56) References Cited

U.S. PATENT DOCUMENTS

| | | | |
|---|---|---|---|
| 2,050,728 | * | 8/1936 | Ost ........................................ 29/148.2 |
| 4,018,979 | * | 4/1977 | Young ................................. 285/179 X |
| 4,633,913 | * | 1/1987 | Carty et al. ........................ 285/179 X |
| 4,730,855 | * | 3/1988 | Pelletier ................................ 285/179 |
| 5,016,924 | * | 5/1991 | Lin ..................................... 285/179 X |
| 5,302,780 | * | 4/1994 | Alfing ............................. 174/21 R X |
| 5,654,526 | * | 8/1997 | Sharp ................................. 285/94 X |

* cited by examiner

*Primary Examiner*—Kristine Kincaid
*Assistant Examiner*—Chau N. Nguyen
(74) *Attorney, Agent, or Firm*—Flehr Hohbach Test Albritton & Herbert LLP

(57) ABSTRACT

A conduit connector and method for coupling a plurality of conduit sections together. The connector includes a conduit body having a first inlet, a second inlet and an interior cavity extending between the first and second inlets. The conduit body is split longitudinally between the inlets into a front member and a back member. The connector also includes a locking system for securing the front and back members together. The method includes the steps of providing a pair of connector sections, one having spaced apart first arcuate stretches and the other having spaced apart second arcuate stretches. The arcuate stretches are each shaped and positioned to engage the exterior end of a corresponding conduit section. The method also includes positioning one connector section on one side of the wiring with each of the first arcuate stretches disposed against one of the first and second exposed ends on one side thereof and positioning the other connector section on the opposite side of the wiring with each of the second arcuate stretches disposed against the other exposed end on the opposite side thereof, and fastening the connector sections together.

5 Claims, 2 Drawing Sheets

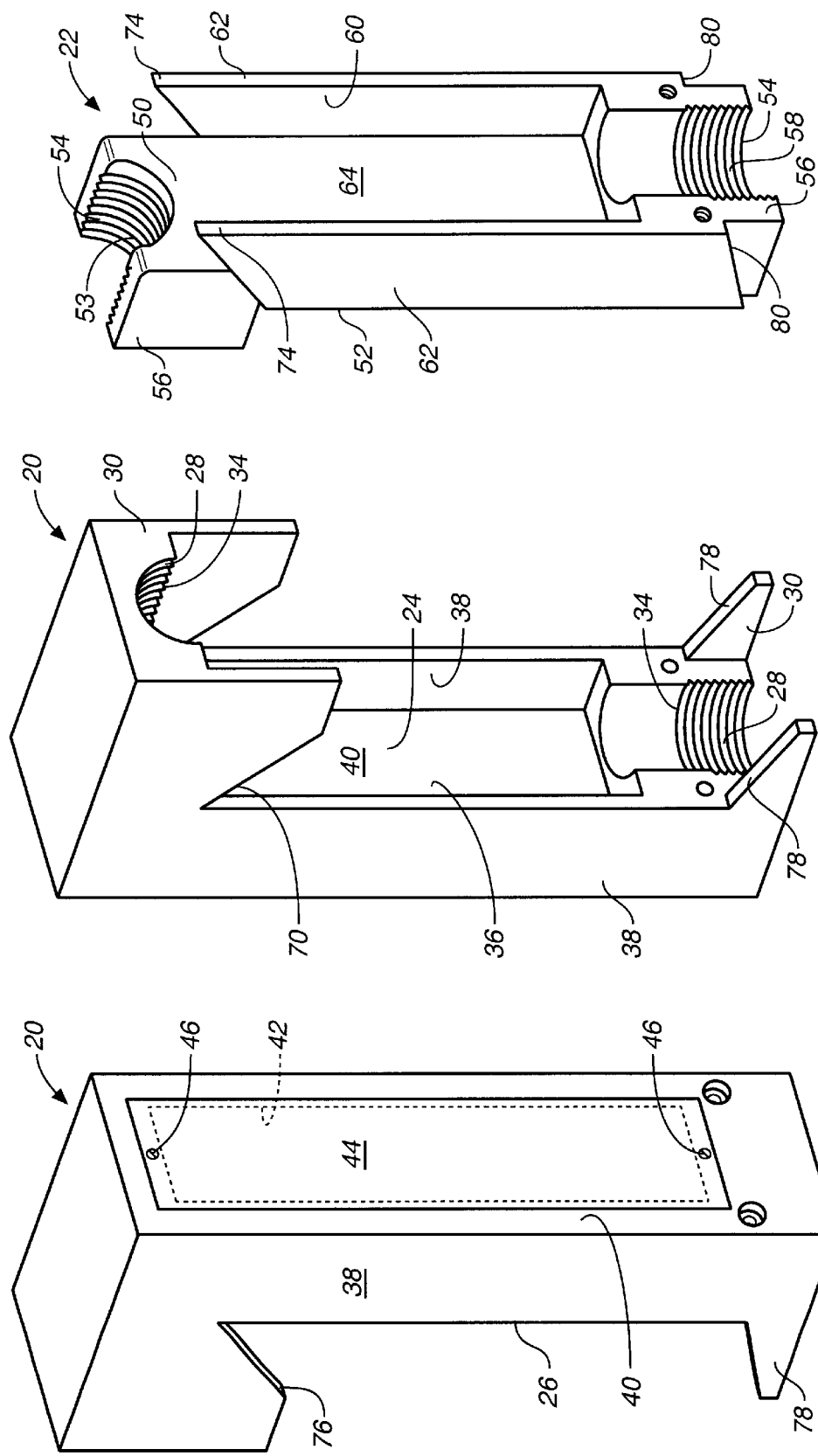

REPLACEABLE CONDUIT CONNECTOR FOR WIRING SYSTEMS

BRIEF DESCRIPTION OF THE INVENTION

The present invention relates in general to a connector for joining two or more conduit sections and, more particularly, to a connector for conduits housing cables, electrical wires and the like.

BACKGROUND OF THE INVENTION

Wiring, such as electrical wiring, telephone lines and cable systems, is often housed within extensive conduit systems which protect the wiring from environmental conditions and the like. The systems typically include several junctions or intersections which occur when the conduit line changes direction or when a single conduit branches into two or more conduits. A special conduit is provided at these junctions, for example an "LB Conduit" is often used where the conduit line changes directions. During installation of the system, the conduit line is laid until the intersection is reached. At that point, the appropriate intersection piece is selected and attached to the exposed end of the conduit line. The next section of the conduit line is then attached to the other end of the intersection piece. Typically, the ends of the conduit sections are threaded and the intersection piece is attached to the conduit sections by screwing the conduit sections and intersection piece together. The wiring is threaded through the conduit sections and intersection piece.

The intersection pieces are often subject to stresses which cause the piece to fracture, break, or become damaged, requiring replacement of the intersection piece. The damaged intersection piece is removed by breaking the part into pieces. The exposed wiring must then cut so that the wires may be individually threaded through the opposite ends of the replacement part. One end of the replacement part is screwed onto one of the conduit sections in the same manner as the initial installation of the conduit line. Since the conduit sections of the installed line are essentially fixed in place, the opposite end of the replacement part may not be screwed onto the next section of the line. Instead, a separate fitting is required between the replacement part and the conduit section. Once the replacement part is installed, the cut sections of wiring must be coupled together. Problems often occur if the wiring is taut since some slack is required to reconnect the wiring. Moreover, cutting the wiring interrupts the services provided by the wiring, for example electricity, telephone or cable service. This lengthy interruption is highly inconvenient to the end user and, in some instances, may even be unacceptable.

A conduit connector which is easy to install and replace is desirable. Similarly, a conduit connector which may be installed without severing the wiring housed by the old conduit connector is desirable.

OBJECTS AND SUMMARY OF THE INVENTION

It is a primary object of the present invention to provide a conduit connector for coupling two or more conduits together is desirable.

It is a further object of the present invention to provide a conduit connector which may be easily installed in both new installations and as a replacement part in an existing installation.

It is another object of the present invention to provide a conduit connector which may be installed around existing wiring to avoid cutting the wiring and disrupting service.

It is yet another object of the present invention to provide a conduit connector which may be directly mounted to each of the conduit sections without the use of supplemental fittings.

A more general object of the present invention is to provide a conduit connector for protecting the wiring housed in the conduit connector, and to provide a conduit connector which may be economically manufactured.

In summary, the present invention provides a conduit connector for coupling together a plurality of conduit sections. The conduit sections are part of a conduit installation which provides a protective housing for wiring, for example telephone, cable or electrical wiring. The conduit connector includes a conduit body having a pair of inlets. The inlets are shaped to receive the exposed ends of the conduit sections. The conduit body also includes an interior cavity between the first and second inlets for housing the wiring which extends across the gap separating the conduits. The conduit body is split longitudinally between the first inlet and the second inlet into a front member and a back member. The conduit connector also includes a locking system which secures the front and back members together when the conduit body is assembled around the exposed wiring and the ends of the first and second conduit sections.

The invention also provides a method of installing a conduit connector in a pre-installed conduit system. The conduit system includes a first conduit section having a first exposed end and a second conduit section having a second exposed end spaced from the first conduit section. The wiring extending through the conduit sections is exposed in the gap between the ends of the conduit sections. The method includes providing a pair of connector sections, one having spaced apart first arcuate stretches and the other having spaced apart second arcuate stretches. The first and second arcuate stretches are each shaped and positioned to engage the exterior of the ends of one of the conduit sections. The method also includes positioning the first connector section on one side of the wiring with each of the first arcuate stretches disposed against one of the exposed ends and positioning the second connector section on the opposite side of the wiring with each of the second arcuate stretches each disposed against the other exposed end on the opposite side thereof. After the positioning steps, the method includes fastening the connector sections together.

Additional objects and features of the invention will be more readily apparent from the following detailed description and appended claims when taken in conjunction with the drawings.

BRIEF DESCRIPTION OF THE DRAWINGS

FIGS. 3 and 4 are pictorial views of the front member of the conduit connector of FIG. 1.

FIG. 5 is a pictorial view of the back member of the conduit connector of FIG. 1.

DETAILED DESCRIPTION OF THE INVENTION

Figure 1:
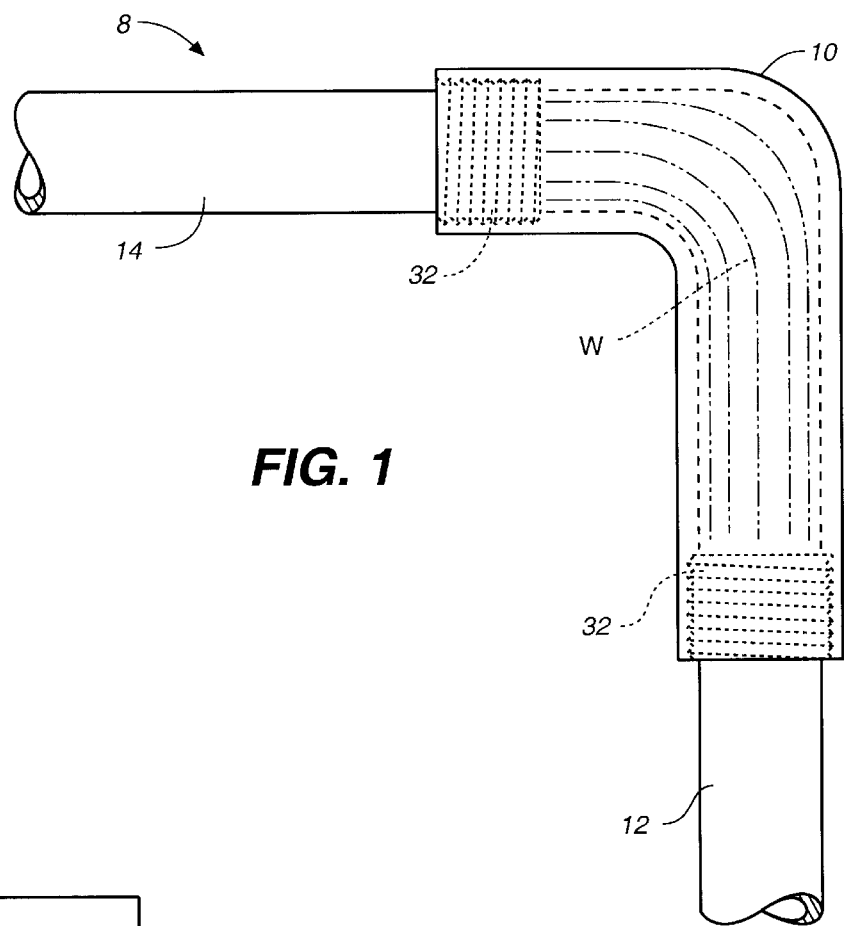
FIG. 1 is a schematic view of a conduit installation incorporating a conduit connector constructed in accordance with the present invention.

Reference will now be made in detail to the preferred embodiment of the invention, which is illustrated in the accompanying figures. Turning now to the drawings, wherein like components are designated by like reference numerals throughout the various figures, attention is directed to FIG. 1.

A portion of a conduit installation 8 incorporating a conduit connector 10 in accordance with the present invention is shown in FIG. 1. The conduit installation generally includes a plurality of conduit sections 12, 14 which provide a protective housing for wiring W. The conduit sections 12, 14 are joined together by the conduit connector 10. In the illustrated application, the installation includes a vertical section 12 and a horizontal section 14, with the conduit connector 10 providing the corner or change in direction from the vertical to the horizontal. The conduit connector 10 also provides the housing for the wiring extending across the gap between the ends of the conduit sections 12, 14. It is to be understood that the conduit installation may have a variety of different configurations. Instead of the perpendicular corner provided by the conduit connector 10 shown in the figures, the conduit sections 12, 14 may be oriented at different angles relative to one another. The conduit sections 12, 14 may also be located along the same axis. Although not shown, the conduit installation 8 may also include an intersection where a greater number of conduit sections are joined.

The conduit connector 10 generally includes a front member 20 and a back member 22 which form the body of the conduit connector 10. When assembled to form the body of the connector 10, the front and back members 20, 22 are positioned on opposite sides of the wiring such that the conduit connector 10 may be assembled around a section of wiring and installed conduit sections 12 and 14 as is described in more detail below. As shown particularly in FIGS. 3 and 4, the front or outer member 20 generally includes an inner face 24 and an exterior 26. The shaped inner face 24 includes arcuate stretches 28 positioned at the opposite ends 30 of the front member 20. The arcuate stretches 28 are shaped to conform to the exterior of the ends 32 of the conduit sections 12, 14. In the illustrated embodiment of the invention, the conduit connector 10 is used with conduits which have threaded ends to facilitate assembly of the conduit sections. The arcuate stretches 28 are formed with threads 34 which mate with the threads on the exterior of the end 32 of the conduit section 12, 14 (FIG. 1). While providing threads 34 on the arcuate stretches 28 are preferred for an optimum fit, it is to be understood that the threads may be omitted if desired. In addition, if a substantially water-tight seal between the conduit sections 12, 14 and the conduit connector 10 is desired, a suitable tape or sealing compound may be applied to the threads on the ends 32 of the conduit sections 12, 14 as is well known for the pipe and plumbing assembly. In the illustrated embodiment, the arcuate stretches 28 extend approximately a half-circle such that the arcuate stretches 28 each extend around about half of the circumference of the conduit section end 32. However, it is to be understood that the extent of the arcuate stretch may be increased or decreased as desired provided the back member 22 is shaped complementary to the front member 20 as discussed below.

Between the arcuate stretches 28, the inner face 24 is shaped to define a trough or channel 36 which defines part of the interior cavity of the assembled conduit connector. The shape of the trough 36 is subject to considerable variation. In the illustrated embodiment, the front member 20 includes side walls 38 and a front wall 40 extending between the side walls 38, providing the trough 36 with a U-shaped configuration. The front wall 40 of member 20 includes a window 42 for exposing the wiring which passes through the conduit connector 10. The window is covered by a metal plate 44 which is attached to the exterior 26 of the front member 20 by suitable fasteners 46. Removing the metal plate provides access to the wiring for testing and the like.

Turning to FIG. 5, the back member 22 also includes an inner face 50 and an exterior 52. The inner face 50 includes arcuate stretches 54 provided at the opposite ends 56 of the back member 22. The arcuate stretches 54 are shaped complementary to the shape of the exterior of the conduit section end 32. As with the arcuate stretches 28, the stretches 54 are preferably provided with threads 58 which mate with the threads on the exterior of the end 32. When the front and back members 20, 22 are assembled to form the body of the conduit connector 10, the arcuate stretches 28 and corresponding arcuate stretches 54 define an inlet into which the end 32 of the conduit section is seated. In the illustrated embodiment, the arcuate stretches 54 each extend approximately a half circle so that they extend around half of the ends of the sections 12, 14. When the conduit connector 10 is assembled around the conduits 12, 14 and wiring W, the edges of the arcuate stretches 54 abut against the edges of the arcuate stretches 28 such that the end 32 is substantially encircled by the arcuate stretches 28, 54. Thus, if the extent of arcuate stretch 28 is increased, the extent of the arcuate stretch 54 is decreased so that the total circumferential extent of the arcuate stretch 28 and corresponding arcuate stretch 54 is 360°. Positioning the arcuate stretches 28, 54 in abutting engagement is preferred in that it substantially reduces or minimizes any gaps between the front and back members, protecting the interior of the conduit connector from dust and other particles. However, it is to be understood that in other embodiments of the invention the total extent of the arcuate stretches 28, 54 may be less than 360°, leaving one or more gaps between the stretches 28, 54.

Figure 2:
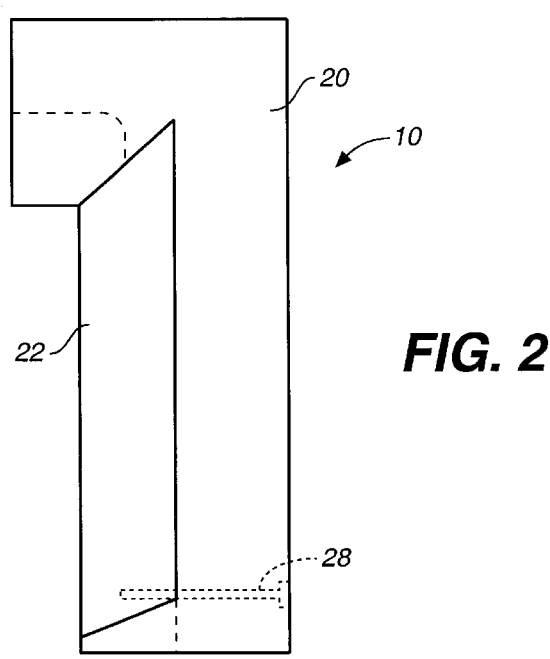
FIG. 2 is a side view of the conduit connector of FIG. 1.

The inner face 50 is shaped to provide a trough or channel 60 between the arcuate stretches 54. The trough 60 cooperates with the trough 36 to define the interior cavity of the conduit connector 10 for housing the wiring W which is fed through the conduits 12, 14. As with the front member 20, the back member 22 includes side walls 62 and a back wall 64 between the side walls 62, providing the trough 60 with a U-shaped configuration. In the illustrated embodiment, the side walls 62 fit against with the side walls 38 forming a seam therebetween as shown in FIG. 2. In other modifications of the invention, it is to be understood that the front and back members 20, 22 may be sized so that the side walls of one member nest inside of the side walls of the other member. This configuration may be desirable where the wiring within the conduit installation 8 requires additional protection against the environment.

The conduit connector 10 includes a locking system for securing the front and back members 20, 22. In the illustrated embodiment, the locking system includes locking members or ears 74 provided on the back member 22 at the upper ends of the side walls 62. The locking members 74 seat in complementary shaped notches 76 formed on the front member 20 near the upper ends of the side walls 36. The locking system also includes a pair of locking members or ears 78 provided at the lower ends of the front member 20. The locking members 78 seat under shoulders 80 provided at the lower ends of the side walls 62 of the back member 22. When the conduit connector 10 is assembled, the front member 20 is lowered onto the back member 22, pivoting the front member 20 relative to the back member 22 as necessary to move the locking members 74 of the back member into the notches 76 on the front member 20 and the locking members 78 on the front member 20 beneath the shoulders 80 on the back member. The interengagement between the locking members 74 and notches 76 and the locking members 78 and the shoulders 80 hold the body together even though the front member 20 is not yet affixed to the back member. The locking system further includes one or more fasteners 82 (FIG. 2) to secure the front and back members 20, 22 together. In the illustrated embodiment, two fasteners are used although it is to be understood that a greater or lesser number may be employed if desired.

In the illustrated embodiment, the locking system includes both locking members which are integrally formed with the front and back members 20, 22 and external fasteners. The integral locking members 74, 76, 78 and 80 facilitate assembly of the conduit connector 10 and ensure that the front and back members 20, 22 will be accurately aligned relative to one another and properly positioned around the conduits 12, 14 and wiring W with the arcuate stretches 28, 54 engaging the threaded ends of the conduits. Once properly positioned, the locking members hold the front and back members 20, 22 together and in place, leaving both of the installer's hands free to focus on the installation of the external fasteners. The additional retention force provided by the external fasteners securely holds the front and back members 20, 22 together, preventing unintentional separation of the front and back members and dislodgement of the conduit connector 10 from the conduit installation. However, it is to be understood that a locking system in which separate fasteners are omitted is also within the scope of the invention. Furthermore, in other modifications of the invention the locking system may rely entirely on the external fasteners for securing the front and back members 20, 22 together.

The conduit connector 10 of this invention may be conveniently installed in an existing conduit system without requiring cutting of the wires or the use of special fittings and the like. Thus, the conduit connector 10 is particularly suitable for replacing a broken or damaged piece. When used as a replacement part, the conduit connector 10 is installed after the conduits 12 and 14 are secured in place and the wiring W has been threaded through the complete conduit line. The connector 10 is installed by positioning the back member 22 on one side of the wiring W with the arcuate stretches 54 positioned against the threaded ends of the conduits 12, 14. While the back member 22 is held in place, the front member 20 is lowered toward the back member 22 from the opposite side of the wiring W. As the front member 20 is moved into place, the arcuate stretches 28 are positioned against the threaded ends of the conduits 12, 14 and the locking members 74 seat in the notches 76 and the locking members 78 are positioned beneath the shoulders 80. Once the front member 20 is snapped onto the lower member 22, the external fasteners are applied to securely mount the front member 20 to the back member 22.

Unlike the conduit connector 10 of the present invention, the installation of the prior art connectors is complicated and time consuming. The wires must be severed and threaded into the upper and lower openings of the conduit from the associated conduit section. One end of the connector is screwed onto the end of one of conduit sections while the other end of the connector is attached using a separate fitting which is screwed onto the end of the conduit and the end of the connector. After the connector is attached to the conduits, each wire must be reattached. The conduit connector 10 of the present invention significantly simplifies the installation of a replacement part.

The conduit connector 10 of this invention may also be used during the initial installation of the conduit system. If desired, the installer may pre-assemble the conduit connector 10 and install the connector in the same manner as the connectors of the prior art. Alternatively, the front and back members 20, 22 may be assembled around one or both conduit sections 12, 14 to eliminate the step of screwing the connector onto one or both conduit sections 12, 14.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the Claims appended hereto and their equivalents.

What is claimed is:

1. A conduit connector for coupling an exposed end of a first conduit section to an exposed end of a second conduit section, the first and second conduit sections providing a housing for wiring, said conduit connector comprising:

a conduit body comprising a first inlet shaped to receive the exposed end of the first conduit section, a second inlet shaped to receive the exposed end of the second conduit section and an interior cavity extending between said first and second inlets for housing wiring extending from the exposed ends of the first and second conduit sections, respectively, said conduit body being split between said first inlet and said second inlet into a front member and a back member, said front member comprising a front wall and opposed exterior walls substantially perpendicular to said front wall, a portion of the face of said front member opposite said front wall being open for access to said interior cavity, said exterior walls being formed with notches and with first ears remote from said notches, said back member comprising a back wall and opposed side walls substantially perpendicular to said back wall, a portion of the face of said back member opposite said back wall being open, said side walls being formed with second ears substantially complementary to said notches and with shoulders remote from said second ears complementary to said first ears, and fastening means to detachably secure said back member to said front member to substantially enclose said conduit body, said second ears fitting into said notches and said shoulders engaging said first ears and outer edges of said exterior walls engaging outer edges of said side walls.

2. The conduit connector of claim 1 in which said first inlet has a first center axis and said second inlet has a second center axis, the second center axis being substantially perpendicular to the first center axis.

3. The conduit connector of claim 1 in which said first inlet and said second inlet each has a threaded interior configured to mate with threads on the exposed ends of the first and second conduit sections, respectively.

4. In combination, the conduit connector of claim 1 and said first conduit section having said first exposed end and said second conduit section having said second exposed end spaced from said first exposed end, and the wiring extending through said first and second conduit sections, said wiring projecting from said first and second exposed ends of said first and second conduit sections, said conduit body being mounted to said first and second conduit sections with said first exposed end positioned in said first inlet and said second exposed end positioned in said second inlet.

5. A method of installing a conduit connector in a pre-installed conduit system including the first and second conduit sections and the wiring of claim 1 wherein the wiring extends from the exposed end of the first conduit section to the exposed end of the second conduit section, the wiring being endless in the region between the exposed ends of the first and second conduit sections, the method comprising the steps of:

providing the conduit connector of claim 1;

positioning said back member on one side of the wiring;

positioning said front member on the opposite side of the wiring; and fastening said front member to said back member to enclose said conduit body around the wiring between the exposed ends of the first and second conduit sections.

* * * * *